United States Patent [19]
Lewis et al.

[11] 3,779,486
[45] Dec. 18, 1973

[54] GAS TURBINE ENGINES

[75] Inventors: Gordon Manns Lewis; Stanley George Hooker, both of Bristol, England

[73] Assignee: The Secretary of State for Defense in Her Britannic Majesty's Government of the United Kingdom of Great Britain & Northern Ireland, London, England

[22] Filed: Sept. 22, 1971

[21] Appl. No.: 182,817

[30] Foreign Application Priority Data
Sept. 26, 1970  Great Britain.................. 45,975/70

[52] U.S. Cl.......... 244/53 R, 60/39.16 R, 60/39.31, 60/39.36, 60/230, 60/232, 60/262, 244/12 D
[51] Int. Cl............................................ B64d 27/10
[58] Field of Search.................. 60/39.16 R, 39.31, 60/39.36, 230, 232, 262; 239/265.19, 265.35; 244/12 B, 12 D, 53 R; 415/104–107

[56] References Cited
UNITED STATES PATENTS

| | | | |
|---|---|---|---|
| 3,589,132 | 6/1971 | DuPont................................ | 60/262 |
| 3,117,750 | 1/1964 | Snell................................ | 60/232 X |
| 3,187,506 | 6/1965 | Switzer........................... | 60/39.36 X |
| 3,622,104 | 11/1971 | Clarke et al....................... | 244/12 B |
| 2,912,188 | 11/1959 | Singelmann et al. ............. | 244/12 D |
| 3,296,804 | 1/1967 | Keenan et al................... | 60/39.31 X |
| 3,531,940 | 10/1970 | Markowski........................... | 60/230 |
| 3,528,247 | 9/1970 | Riemerschmid...................... | 60/232 |
| 3,186,166 | 6/1965 | Grieb............................. | 60/39.16 R |

FOREIGN PATENTS OR APPLICATIONS

| | | | |
|---|---|---|---|
| 1,006,205 | 9/1965 | Great Britain........................ | 60/232 |
| 895,467 | 5/1962 | Great Britain..................... | 60/39.31 |
| 696,133 | 8/1953 | Great Britain...................... | 415/106 |

*Primary Examiner*—Trygve M. Blix
*Assistant Examiner*—Stephen G. Kunin
*Attorney*—Stevens, Davis, Miller & Mosher

[57] ABSTRACT

A gas turbine engine for use in aircraft in which a substantial part of the gases discharged from the engine are exhausted through swivel type nozzles capable of varying the direction of the discharge, which are disposed between the compressor and the turbine. Several embodiments are proposed and in general the engines are characterised in that the flow through the compressor is in the opposite direction to the flow through the combustion chamber and turbine.

10 Claims, 6 Drawing Figures

GAS TURBINE ENGINES

This invention relates to a gas turbine engine which is capable for use in an aircraft to give the aircraft vertical or short take-off (V/STOL) capability.

According to the invention there is provided a gas turbine engine for use in aircraft, having compressor means, combustion means and turbine means arranged to drive the compressor means, in which a substantial part of the gases discharged from the engine are arranged to be exhausted through means capable of varying the direction of discharge, which means are disposed between the compressor means and the turbine means.

According to a feature of the invention there is provided an aircraft having a gas turbine engine which comprises compressor means, combustion means and turbine means arranged to drive the compressor means, in which a substantial part of the gases discharged from the engine are arranged to be exhausted through means capable of varying the direction of discharge relative to the normal attitude of the aircraft between downward and rearward, and means being disposed between the compressor means and the turbine means of the engine in such a position that the thrust from downward discharge acts substantially through the centre of gravity of the aircraft.

According to another feature of the invention there is provided a gas turbine engine for use in aircraft, comprising in flow series compressor means, combustion means and turbine means in which the flow through the compressor means is in the opposite direction to the flow through the turbine means and the gases discharged from the engine are arranged to be exhausted through means capable of varying the direction of discharge, which means are disposed between the compressor means and the turbine means. According to an aspect of the invention there is provided a gas turbine engine for use in aircraft comprising in flow series low and high pressure compressors, combustion means and, high and low pressure turbines in which the flow through the high pressure compressor and the high and low pressure turbines is in the opposite direction to the flow through the low pressure compressor and in which the high pressure turbine is arranged to drive the high pressure compressor and in which a substantial part of the gases discharged from the engine are arranged to be exhausted through means capable of varying the direction of discharge relative to the normal attitude of the aircraft from forwards through downwards to rearward, said means being disposed between the low pressure compressor and the low pressure turbine of the engine in such a position that the thrust from the downward discharge acts substantially through the centre of gravity of the aircraft.

Constructional forms of the invention will now be described by way of example only, with reference to the accompanying drawings in which:

FIGS. 1, A, B, C, together show a horizontal longitudinal section through a single spool gas turbine engine constructed in accordance with the invention.

Figure 1A:
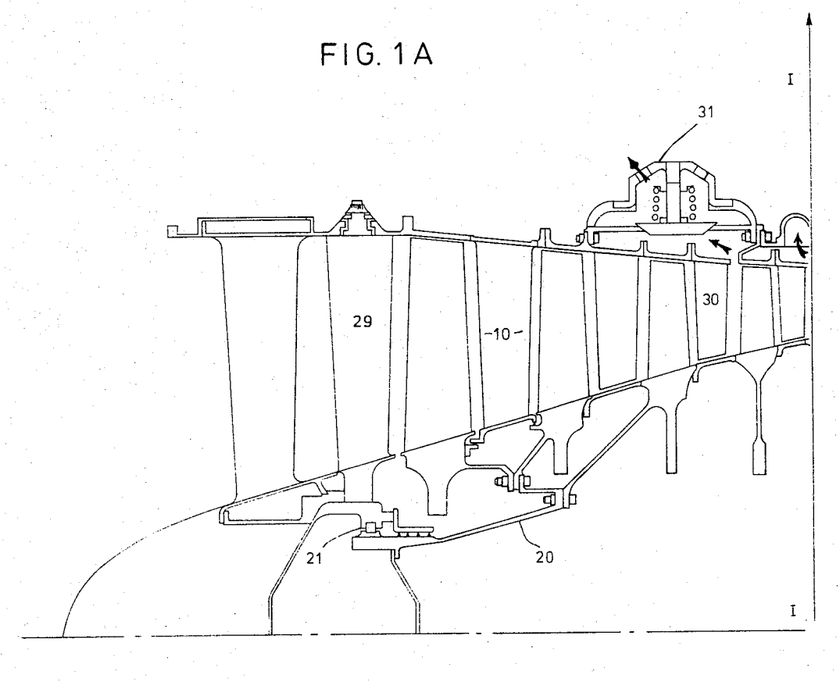
Figure 1B:
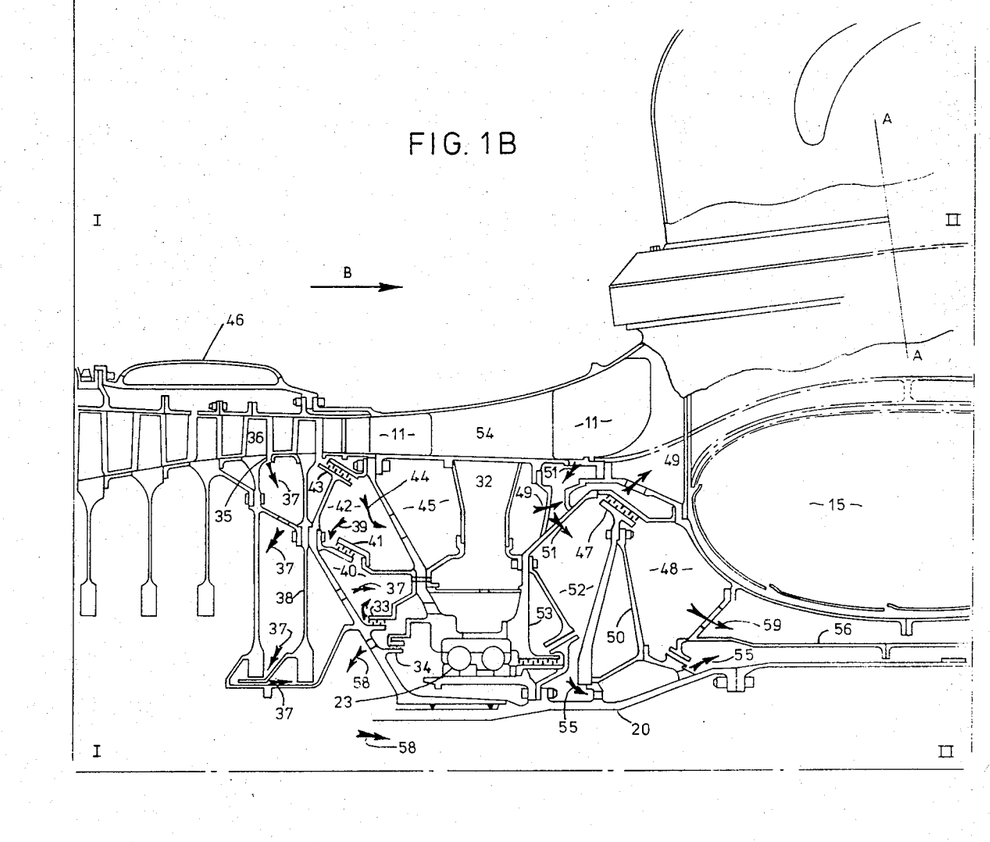
Figure 1C:
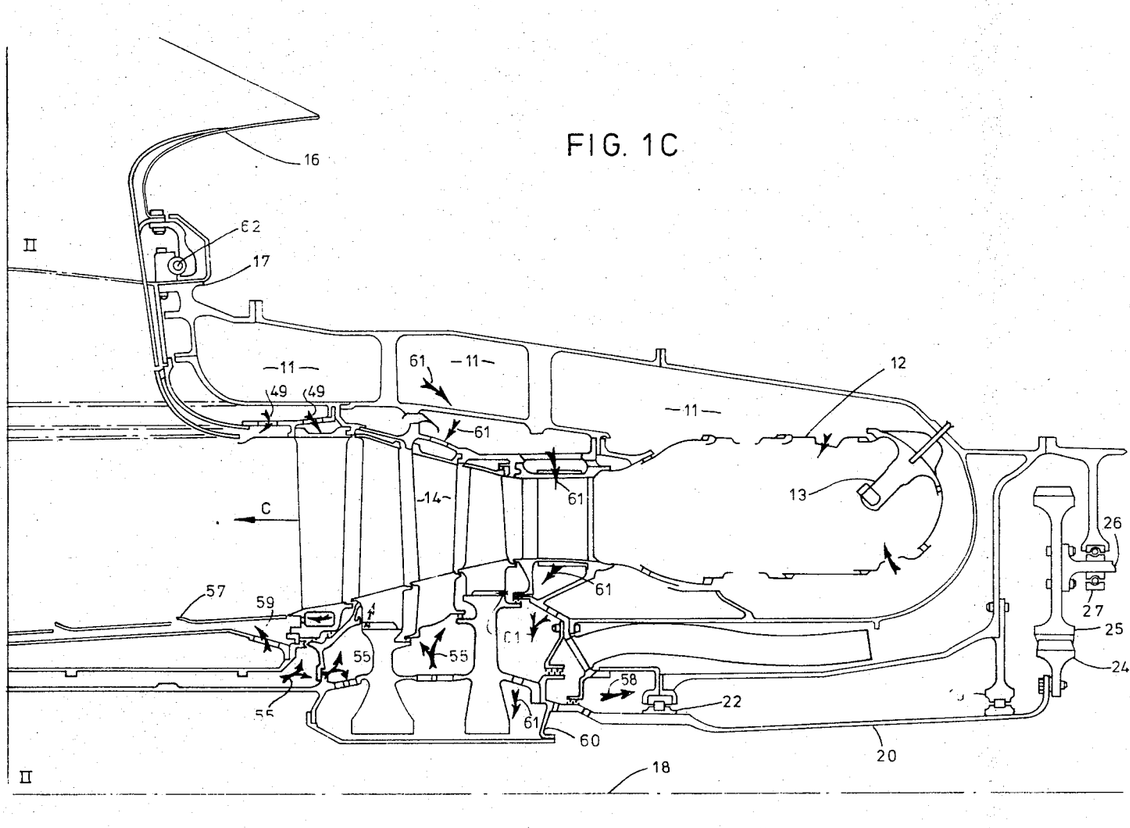

Referring now to FIGS. 1A, 1B and 1C the gas turbine engine illustrated has a single spool with compressor means 10 in the form of a multi-stage compressor which delivers air in the direction B. This air is ducted along a conduit 11 and diffused into a reverse flow combustion chamber 12 in which the direction of flow is reversed. Fuel is introduced into the combustion chamber through vaporizers such as 13 and burnt in the incoming air. The products of combustion are delivered into a two stage turbine 14, the flow through which is in the direction of arrow 'C', i.e., in the opposite direction to arrow 'B'. The gases leaving turbine 14 pass into the plenum chamber 15 which extends around the engine and which communicates with a pair of oppositely disposed swivellable nozzles such as 16 (only one shown); when mounted in an aircraft the nozzles are arranged to be horizontally opposed.

The nozzles, such as 16, are also arranged to swivel about axes such as AA on a track 17 so that when the engine is installed in an aircraft with its longitudinal axis 18 lying in the fore-and-aft direction of the aircraft, the nozzles are capable of directing the exhaust efflux between a position for substantially downward discharge and positions for substantially rearwards/forwards discharge. This gives the aircraft the capability of performing V/STOL operations.

The engine illustrated in FIGS. 1A, 1B and 1C being a single spool engine has at least one of the stator stages 29 in its compressor arranged to have variable angles of attack so as to enable the operating characteristics of the compressor to be varied to match the air delivery requirements over the whole range of engine operation.

The single spool of the engine is mounted on a composite shaft 20 and supported by three roller bearings 21, 22, 19 and a thrust bearing 23. Attached to the rear of the shaft 20 is a gear 24 which meshes with a gear 25 to drive the engine accessories (not shown) through a shaft 26 supported in a bearing 27. The grouping of the engine accessory equipment at the rear of the engine facilitates servicing thereof and it will be noted that the accessory equipment does not project outside the largest diameter of the engine. An additional advantage is that the weight of the accessories towards the rear of the engine compensates for the weight of the compressor so that the thrust from the swivellable nozzles may act substantially through the centre of gravity of the engine; this is a useful feature when the engine is installed in an aircraft.

A further advantage of mounting the accessories at the rear of the engine is that the accessory casings may be used to stiffen the rear engine casing which is under a considerable load due to the need to contain the high pressure gas delivered from the compressor and reverse its direction of flow. This feature prevents the rear casing from becoming unduly heavy.

Because the direction of flow through the compressor is opposite to the direction of flow through the turbine the forces acting on the single spool of the engine, deriving from the gas flows in the compressor and turbine, will act in the same direction, i.e., they will be cumulative, and will not at least partially cancel each other. To reduce the forces acting on the thrust bearing a piston-in-cylinder arrangement is provided to transfer at least some of these forces directly to the outer casing of the engine.

The air system for the engine, which is used to actuate the piston-in-cylinder arrangement will now be described.

There are several stages along the compressor from which air is tapped for various purposes and it will be appreciated that the more compressed the gas becomes the higher its pressure and temperature.

Air is first tapped off after the fourth stage stator blade 30 via a blow off valve 31; as this is moderately cool air of medium pressure it is led via the duct 32 to the main thrust bearing 23 where it is used for cooling and seal blowing and then escapes through seals 33, 34. The air leaving seal 33 is mixed with low pressure air which has passed through the seal 35 situated after the 8th stage rotor blade 36 and, as shown by arrows 37 leaked round the rear face of the rotor disc 38 into the space 40. (Air having leaked through a seal or a succession of seals undergoes a reduction in pressure across each seal). Some leakage air (shown by arrow 39) from seal 41 also mixes with the air in chambers 40 and the resulting low pressure air is led back up ducts (not shown) inside the duct 32 to be used for cooling purposes.

Other air escaping into chamber 42 through seal 43 ensures that there is low pressure air on both sides of compressor disc 38, there is therefore substantially no net bending moment on this disc.

Air from chamber 42 flows as indicated by arrow 44 into chamber 45 where it is mixed with sixth stage delivery air which has been tapped off into the manifold 46, the majority of this air is used for exhaust cooling purposes as shown by arrow 49, the remainder passes through seal 47 into chamber 48 where it provides a low pressure on the rear face of the diaphragm 50.

High pressure delivery air from the compressor flows, as shown by arrows 51, into the chamber 52 on to the front face of the diaphragm 50.

In this manner a net gas load is transmitted in the rearward direction to the shaft 20, thus unloading the thrust bearing 23, and the gas load is reacted to the engine outer casing by way of structure such as 53 and vanes such as 54.

The high pressure air in chamber 52 is then communicated as shown by arrows 55 along the space between the shaft 20 and the liner 56 to the turbine where it is used for turbine blade cooling.

The low pressure air from chamber 48 flows along the outside of the liner 56, as shown by arrows 59, and is used for film cooling of the exhaust plenum chamber diffusing into the chamber through lips such as 57.

The low pressure air escaping through seal 34 follows the path indicated by arrows 58 and flows along the shaft 20 to be used for cooling and seal blowing on the rear roller bearings 22, 19. An additional gas load helping to reduce the load on the thrust bearing is provided by high pressure air on the front face of the shaft shoulder at 60 and the low pressure air (for bearing cooling) on the rear face of this shoulder. High pressure air is also supplied from the conduit 11 for turbine stator blade cooling as shown by the arrows 61. All spent gases are returned to the exhaust flow through the plenum chamber 15

Sixth stage compressor delivery is also used to cool the nozzle race bearings 62. The nozzles may be mounted on the engine casing as shown, or on the aircraft, this however necessitates complex sealing arrangements to prevent hot gas leakage.

In a modification (not shown) the roller bearing 22 is replaced by a thrust bearing and the thrust reaction is used to carry part of the gas load on the rear casing.

Figure 2:
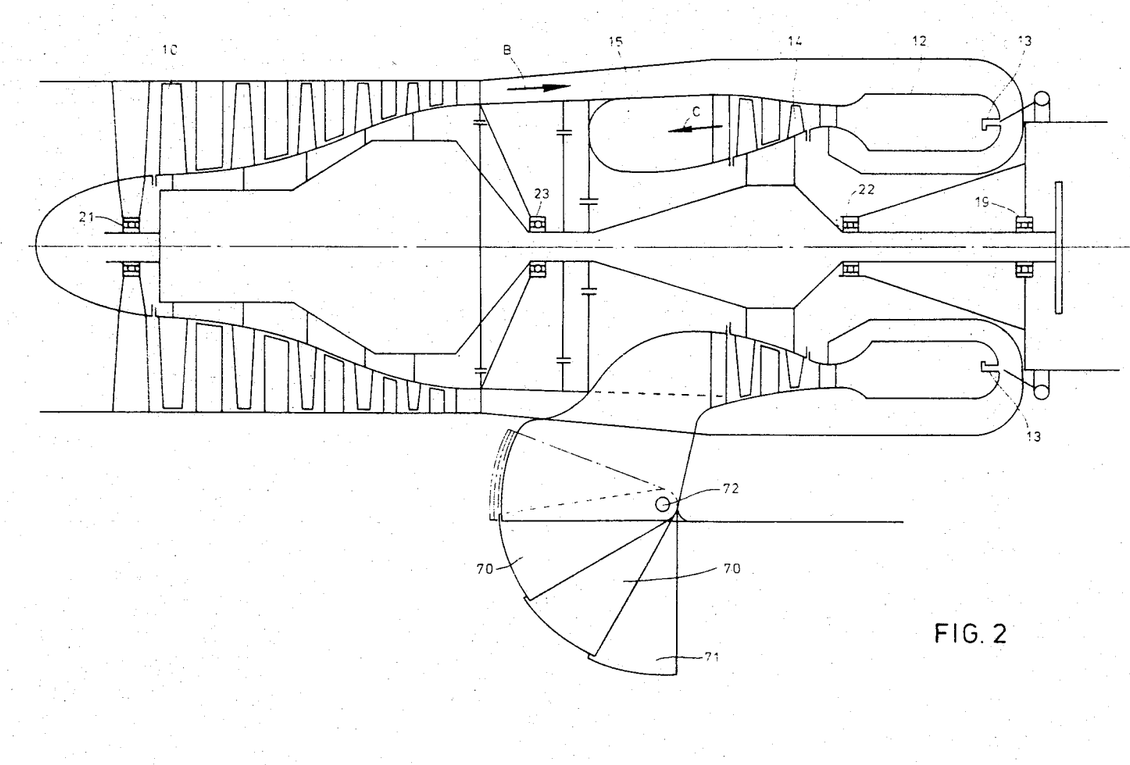
FIG. 2 is an alternative embodiment of a single spool engine according to the invention.

Referring now to FIG. 2, there is shown an engine similar in construction to the engine illustrated in FIG. 1, comprising compressor means 10, combustion means 12 and turbine means 14 driving the compressor means 10. In the engine of FIG. 1 the turbine exhaust is delivered into a plenum chamber 15 and discharged through two nozzles. In the engine of FIG. 2 the turbine exhaust is delivered to a plenum chamber 15 and directed through a single discharge nozzle 70 which has a series of telescopic clam shell elements 71 enabling the direction of discharge to be varied over substantially 90°. The elements 71 are shown in their extended position for substantially rearwards discharge, relative to the normal attitude of the aircraft. For downward discharge the elements telescope one into the other as shown in broken lines, pivoting about an axis 72 perpendicular to the plane of FIG. 2.

An aircraft including this engine has the nozzle positioned beneath its fuselage on its fore and aft centre line and the nozzle is capable of varying the direction of discharge from downwardly to rearwardly to give the aircraft V/STOL capability.

The engines illustrated in FIGS. 1A, 1B and 1C and 2 are generally of the kind classified as single spool turbojet engines, that is, in which substantially the whole of the air compressed by the compressor is delivered to the combustion chamber. It will be understood that the engines illustrated could be modified to a by-pass engine so that a portion of the air compressed by the compressor is delivered to the swivelling nozzle or nozzles without passing through the combustion chamber.

The by-pass air could either by-pass the nozzles by constructing nozzles (not shown) comprising two co-axial nozzles arranged such that the exhaust flow passes through the centre nozzle and the by-pass air flows through the surrounding nozzle or vice versa.

In the engines illustrated in FIGS. 1A, 1B and 1C and 2 provision can be made in the plenum chamber 15 for afterburning, that is for burning additional fuel in the exhaust gases. This facility can be used in aircraft operations to provide additional thrust during V/STOL operations and also for providing additional forward thrust when high speed and rapid manoeuvrability are required.

Provision can also be made in either of the engines of FIGS. 1 and 2 for an auxiliary nozzle, which may be of variable area, to be positioned immediately downstream of the turbine for controlling the gases leaving the turbine so as to permit more economical low speed operation of the engine and so as to control the exhaust area when additional fuel is burnt in the plenum chamber.

Although the engines illustrated have only a single spool it would be possible for multi-spool arrangements to be used. In one form of such a two-spool engine, the engine would comprise in flow series, a low pressure compressor, a high pressure compressor, a combustion chamber, a high pressure turbine and a low pressure turbine. However, as the direction of flow through the compressor means would be in the opposite direction to the flow through the turbine means the arrangement would be such that the low pressure turbine would be driving the high pressure compressor and the high pressure turbine would be driving the low pressure compressor. In this case additional provision would be made for variation of stator blade angles of attack so as to match the operating characteristics of various parts of the engine.

In an alternative form of two-spool engine according to the invention, air enters the engine at about its middle, passes forwards through a low pressure compressor and then through a high pressure compressor; the gases are then ducted to the rear of the engine and travel forwards again through a combustion chamber, a high pressure turbine and a low pressure turbine and leave through one or more swivellable nozzles positioned at about the middle of the engine. With this arrangement, the low pressure compressor is close to the low pressure turbine and is driven by it whilst the high pressure compressor is driven by a shaft extending through the low pressure compressor and low pressure turbine and connected to the high pressure turbine.

Figure 3:
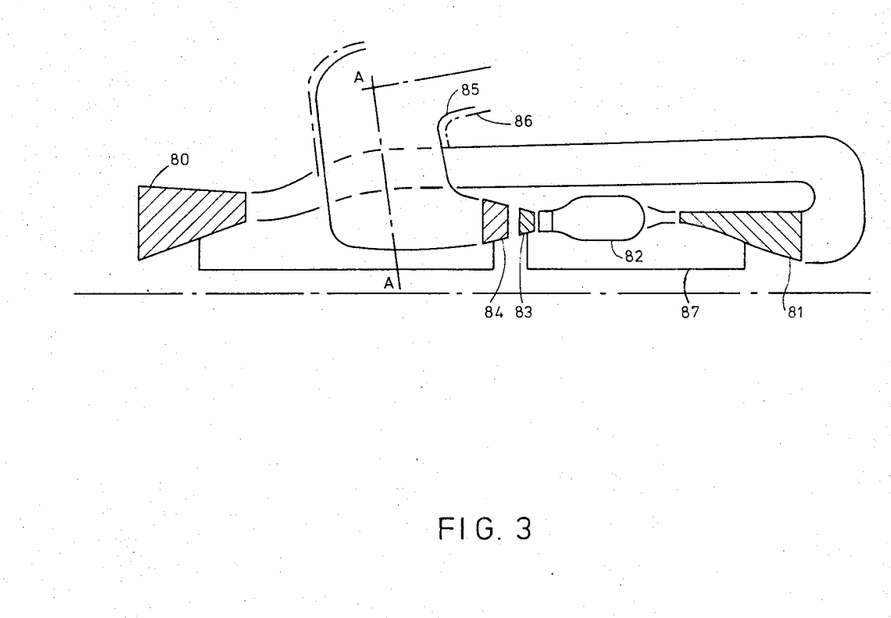
FIG. 3 is a horizontal longitudinal section through a two spool gas turbine engine constructed in accordance with the engine.

In another alternative form of two-spool engine, shown in FIG. 3, the high pressure compressor 81 and turbine 83 are axially separate from the low pressure compressor 80 and turbine 84. Gas flow takes place in one direction through the low pressure compressor and it is then ducted to the other end of the engine and reverses direction to flow successively through the high pressure compressor 81, combustion chamber 82, high pressure turbine 83 and low pressure turbine 84 and leaves at a position between the low pressure compressor and the low pressure turbine. In this arrangement the high pressure shaft 87 can be considered as merely an additional gas generator which increases the overall thrust delivery of the engine.

Provision is also made for ducting by-pass flow from the low pressure compressor 80 around the outside of the swivellable nozzle 85, this provision is shown in chain dotted lines 86. The nozzle 85 may swivel about the axis AA to provide V/STOL capability.

This two spool arrangement of a reverse flow V/STOL engine has several important advantages. The two spools may rotate in opposite directions thereby substantially cancelling the gyroscopic couple that would exist with a single spool and which would have to be counteracted in a single spool engine by providing suitable air bleed nozzles.

The problem of the compressor and turbine loads acting in the same direction and having to be counteracted as previously described is not so acute with a two spool arrangement, as it is only the low pressure spool that requires some form of pressure balancing to relieve its thrust bearing of axial loads. A piston in cylinder arrangement as previously described may be applied to the low pressure spool. The low pressure compressor delivery pressure can be matched to suit the exhaust pressure so that the exhaust duct can be forced convection cooled by the main airflow.

The pressure acting on the rear casing is reduced as is the temperature and it would be possible to run the engine at higher pressure ratios. The accessories can still be driven from the rear of the engine by a shaft attached to the high pressure compressor spool.

Figure 4:
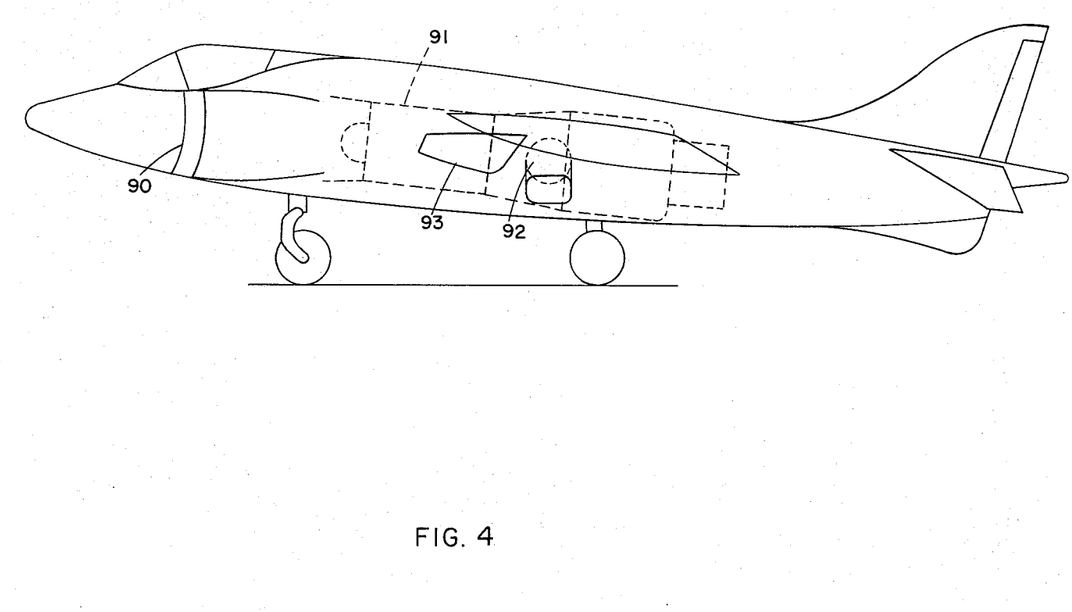
FIG. 4 illustrates an aircraft constructed in accordance with a feature of the invention.

Referring now to FIG. 4, the aircraft illustrated has a pair of intakes 90 (one only of which is seen in FIG. 4) delivering air to an engine 91 which is identical to that shown in FIG. 1. The engine has a pair of swivelling nozzles 92 (again only one is seen in FIG. 4) disposed on opposite sides of the fuselage. The arrangement of the swivelling nozzles between the compressor means and the turbine means of the engine is such that the resultant thrust delivered by the engine passes fairly close to the centre of gravity of the engine. This enables the engine to be positioned substantially in the middle of the fuselage of the aircraft so that the resultant thrust passes substantially through the centre of gravity of the aircraft. This arrangement also allows the pilot to be positioned well forward in the aircraft thus giving him good visibility.

A further advantage of this arrangement is that the air intake to the engine, which is split into two portions, one either side of the fuselage, can be extended well to the front of the fuselage thus maximising the distance between the intake and the exhaust nozzles and reducing the possibility of re-ingestion.

The aircraft has a valance 93 in front of each nozzle to improve aerodynamic efficiency when moving forwards. It is also provided with puff pipes (not shown) which are positioned near the extremities of the wings and at the nose and tail for controlling aircraft attitude. These puff pipes receive compressed air bled from the engine compressor.

Twin engine installations using two engines according to the invention are possible with cross-over pipes to allow stability when running only on one engine.

What I claim is:

1. A turbojet gas turbine engine for use in an aircraft comprising axial flow compressor means arranged for flow in a first direction to receive all of the air entering the engine; combustion means arranged to receive the entire delivery of the compressor means, the flow through said combustion means being in a second direction opposite to said first direction; axial flow turbine means arranged for flow in said second direction to receive the entire delivery of the combustion means, the direction of air flow being reversed only once in flowing from said compressor to said turbine; said swivelable nozzle means capable of varying the direction of discharge disposed about a transverse plane between the compressor and turbine means, said nozzle means being arranged to receive all of the turbine exhaust.

2. A gas turbine engine according to claim 1 having an engine casing, at least one thrust bearing associated with at least one main shaft, and wherein the thrust load on said thrust bearing is at least partially relieved by a piston-in-cylinder arrangement comprising, a diaphragm connected to the associated shaft, a structure connected to the engine casing, a seal between the structure and the shaft, a seal between the diaphragm and the structure, and means for maintaining a relatively high pressure on one side of the diaphragm and a relatively low pressure on the other side of the diaphragm thereby to cause an axial load on the shaft which relieves the thrust load on the thrust bearing.

3. An engine according to claim 1 such that the thrust from discharge in the downward direction acts substantially through the center of gravity of the engine.

4. A gas turbine engine according to claim 1 wherein said swivelable nozzle means are horizontally opposed.

5. A gas turbine engine according to claim 1 wherein said swivelable nozzle means capable of varying the direction of discharge comprises a single clam shell nozzle, having a series of telescopic clamshell elements arranged to vary the direction of discharge between downwards and rearwards.

6. A gas turbine engine according to claim 1 having a plenum chamber and including means for afterburning therein and having an additional nozzle situated downstream of the turbine capable of controlling the exhaust area during afterburning.

7. A gas turbine engine according to claim 1 in which said compressor means comprises high and low pressure compressors and said turbine means comprises high and low pressure turbines and wherein the flow through the combustion means and the turbine means is in the opposite direction to the flow through the low pressure compressor means.

8. A turbojet gas turbine engine having at least one main shaft for use in an aircraft comprising axial flow compressor means arranged for flow in a first direction to receive all of the air entering the engine; combustion means arranged to receive the entire delivery of the compressor means; axial flow turbine means arranged for flow in a second direction opposite to the first to receive the entire delivery of the combustion means; swivelable nozzle means capable of varying the direction of discharge disposed about a transverse plane between the compressor and turbine means, said nozzle means being arranged to receive all of the turbine exhaust; engine accessories mounted at the rear of said engine; a shaft for driving said accessories; and means for connecting said shaft with a main shaft of said engine.

9. A turbojet gas turbine engine for use in an aircraft comprising axial flow compressor means arranged for flow in a first direction to receive all of the air entering the engine, said compressor means comprising low and high pressure compressors; combustion means arranged to receive the entire delivery of the compressor means; axial flow turbine means arranged for flow in a second direction opposite to the first to receive the entire delivery of the combustion means, said turbine means comprising low and high pressure turbines, the flow through said high pressure compressor and said low and high pressure turbines being in the opposite direction to the flow through said low pressure compressor, said high pressure turbine driving said high pressure compressor and said low pressure turbine driving said low pressure compressor; and swivelable nozzle means capable of varying the direction of discharge disposed about a transverse plane between the low pressure compressor and the low pressure turbine in such a position that the thrust from the downward discharge acts substantially through the center of gravity of the aircraft, said nozzle means being arranged to receive all of the turbine exhaust.

10. A turbojet gas turbine engine for use in an aircraft comprising axial flow compressor means arranged for flow in a first direction to receive all of the air entering the engine, combustion means arranged to receive the entire delivery of the compressor means; axial flow turbine means arranged for flow in a second direction opposite to the first to receive the entire delivery of the combustion means; and swivelable nozzle means capable of varying the direction of discharge disposed about a transverse plane between the compressor and turbine means, said nozzle means being arranged to receive all of the turbine exhaust, said nozzle means being further arranged so that for discharge in a downward direction the thrust from the engine acts substantially through the center of gravity of the aircraft.

* * * * *